(12) United States Patent
Pan

(10) Patent No.: US 7,048,404 B2
(45) Date of Patent: May 23, 2006

(54) TRANSPARENT DECORATIVE BELT

(76) Inventor: Wun Fang Pan, No. 123, Lane 99, Pu Din Road, Hsinchu City (TW)

( * ) Notice: Subject to any disclaimer, the term of this patent is extended or adjusted under 35 U.S.C. 154(b) by 0 days.

(21) Appl. No.: 10/770,496

(22) Filed: Feb. 4, 2004

(65) Prior Publication Data

US 2005/0168971 A1    Aug. 4, 2005

(51) Int. Cl.
*F21V 21/108*    (2006.01)
(52) U.S. Cl. .................. 362/108; 362/806; 362/565; 362/124; 362/320; 362/326
(58) Field of Classification Search ............... 362/108, 362/565, 103, 105, 106, 124, 320, 326, 806
See application file for complete search history.

(56) References Cited

U.S. PATENT DOCUMENTS

| 3,641,333 | A | * | 2/1972 | Gendron | 362/108 |
| 4,234,907 | A | * | 11/1980 | Daniel | 362/556 |
| 2005/0047136 | A1 | * | 3/2005 | Fan | 362/252 |

* cited by examiner

*Primary Examiner*—Sandra O'Shea
*Assistant Examiner*—Sharon Payne
(74) *Attorney, Agent, or Firm*—Rosenberg, Klein & Lee

(57) ABSTRACT

A transparent decorative belt, which has an undulating surface on one side or both sides is provided to be wrapped around a frame of a patterned decoration having a light string wound thereon. The light emitted from the bulb assembly of the light string is refracted by the transparent decorative belt to increase the lighting effect.

2 Claims, 3 Drawing Sheets

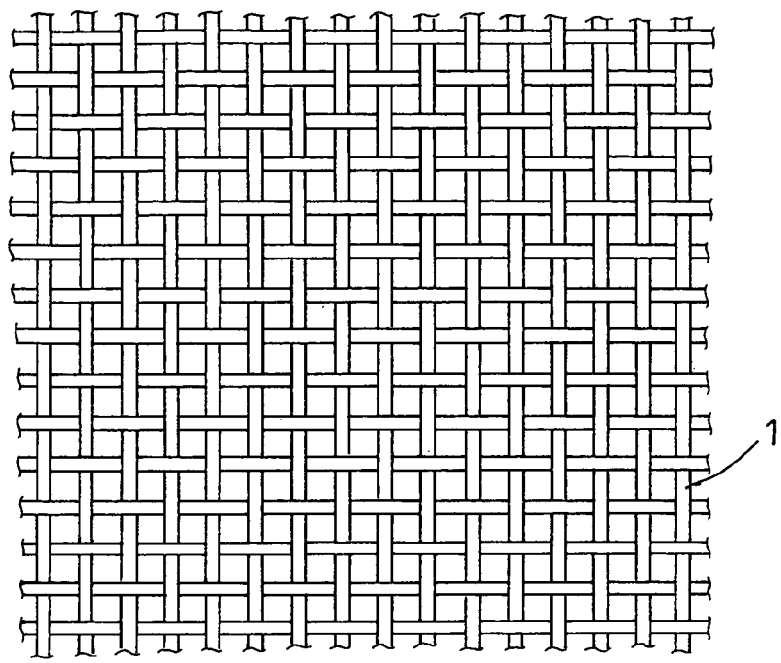
F I G. 3
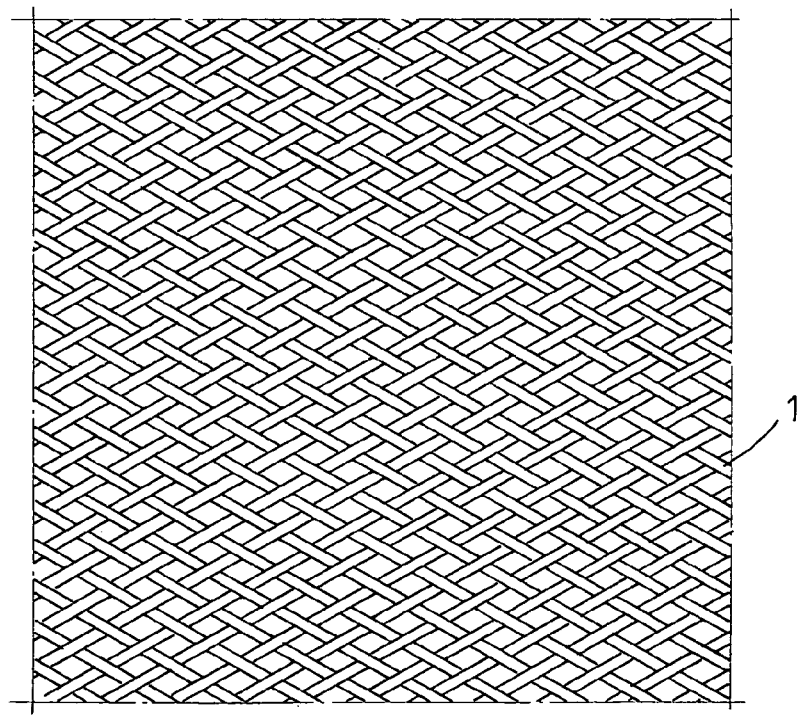
F I G. 4

TRANSPARENT DECORATIVE BELT

BACKGROUND OF THE INVENTION

A conventional patterned decoration is usually formed by a specific frame and then wound with light strings to obtain a patterned lighting decoration. In order to provide diffuse lighting, the patterned decoration is always covered with a translucent paper or plastic layer to create a hazy effect.

Accordingly, the present invention provides a transparent decorative belt, which can be wound around the frame of a patterned decoration to provide a perfect lighting effect. Now, accompanying with the following drawings, the character of the present invention will be described.

BRIEF DESCRIPTION OF THE DRAWINGS

FIG. 3 is a plan view showing another embodiment of the assembly according to the present invention.

FIG. 4 is a plan view showing a further embodiment of the assembly according to the present invention.

DETAILED DESCRIPTION OF THE PREFERRED EMBODIMENT

Figure 1:
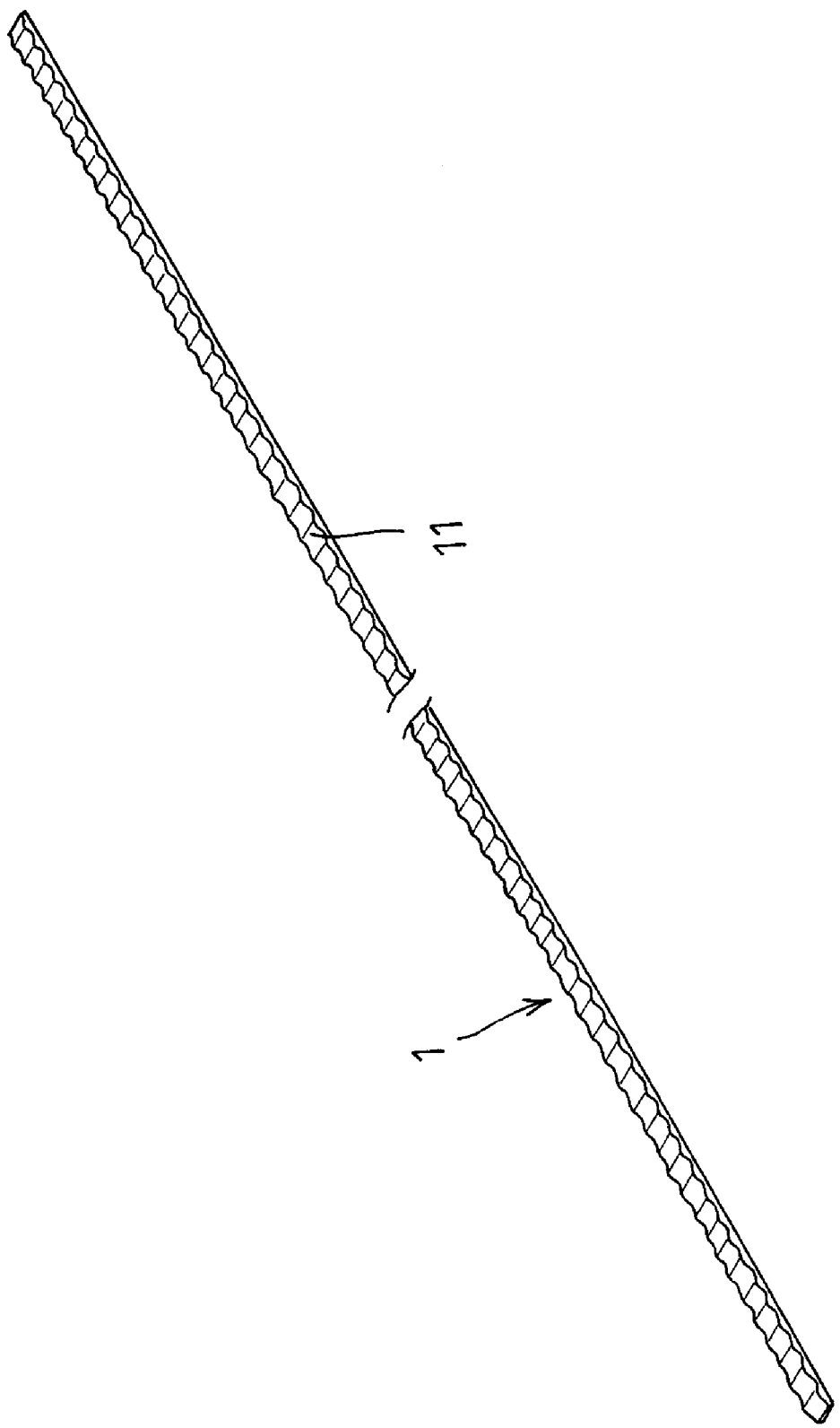
FIG. 1 is a perspective view showing a transparent decorative belt according to the present invention.
Figure 2:
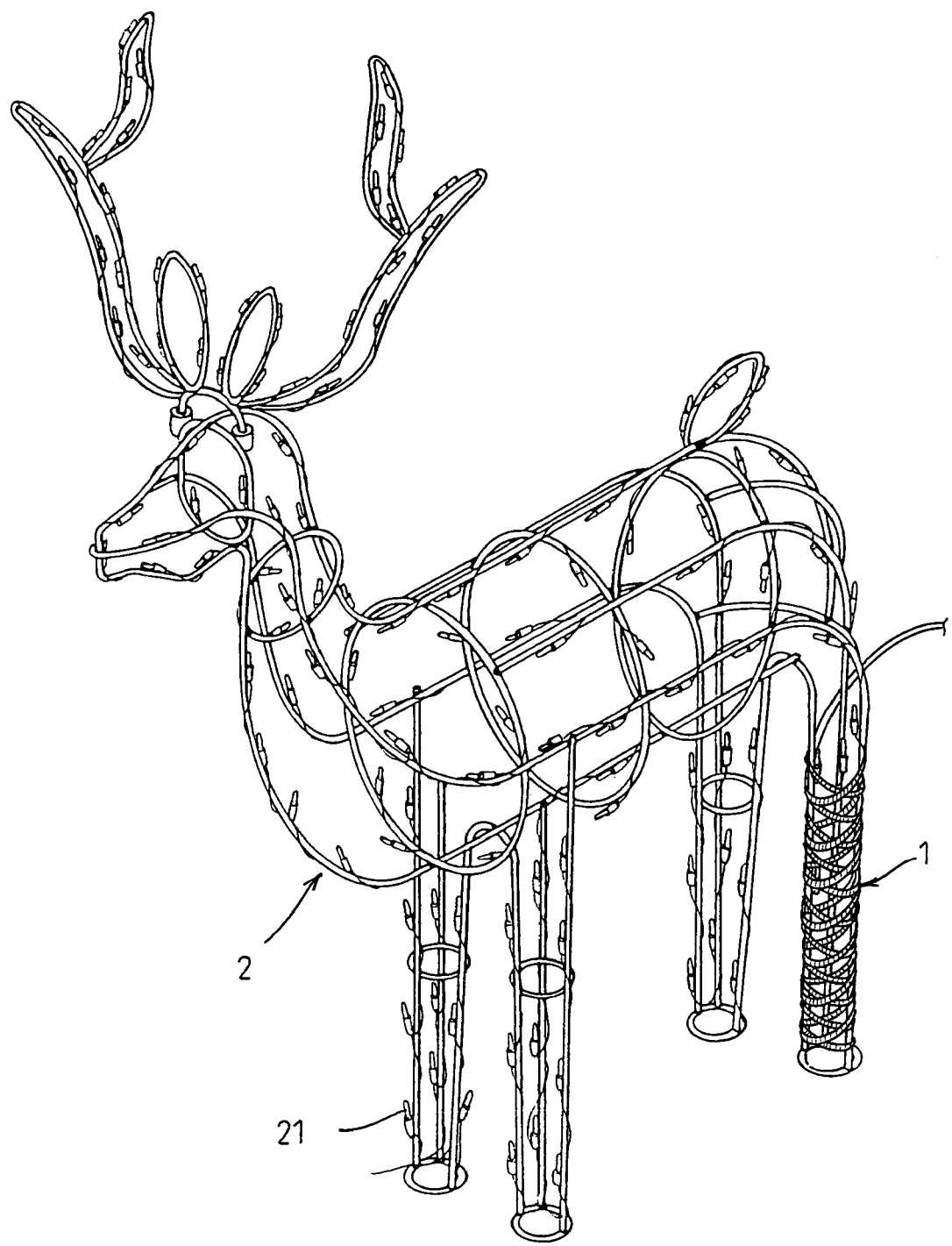
FIG. 2 is a perspective view showing an application of the decorative belt being used on a patterned decoration.

Please referring to FIGS. 1 and 2, the present invention relates to a transparent decorative belt (1), which is made of transparent or semi-transparent material. The surface, one or both, of the belt (1) can be formed with a continuous wave structure (11). In use, the decorative belt (1) is wound around the frame of a patterned decoration (2), as shown in FIG. 2. When the patterned decoration (2) is totally covered by the belt (1), the light emitted from the bulb assembly (21) will be refracted randomly through the wave structure (11) of the belt (1) that can display a perfect shinning effect.

Furthermore, in applying the present invention to a large area of a big patterned decoration, the decorative belt (1) of the present invention can be assembled as a net or web, in advance, as shown in FIG. 3 or 4. Then the belt assembly net or web can be covered directly on the patterned decoration more easily and reduce the winding process and wrapping time.

Above all, the present invention uses the decorative belt having a wave surface for refracting the light of the bulbs to increase the lighting effect.

I claim:

1. A transparent decorative belt and patterned decorative lighting display combination, comprising:
    a patterned decorative display frame;
    a lighting string assembly having a plurality of lamps wound on the patterned decorative display frame; and,
    a transparent decorative belt having an undulating surface, the transparent decorative belt being wrapped on the patterned decorative display frame overlaying the lighting string assembly, wherein light emitted from the plurality lamps of the lighting string assembly is refracted through the undulating surface of the belt.

2. The transparent decorative belt as claimed in claim 1, wherein the decorative belt is assembled into a planar web in advance of being wrapped on the patterned decorative display frame.

* * * * *